United States Patent
Markovski et al.

(10) Patent No.: US 11,273,427 B2
(45) Date of Patent: Mar. 15, 2022

(54) FABRICATION OF HYDROXYAPATITE BASED HYBRID SORBENT MEDIA FOR REMOVAL OF FLUORIDE AND OTHER CONTAMINANTS

(71) Applicants: Jasmina Markovski, Mesa, AZ (US); Kiril D. Hristovski, Gilbert, AZ (US)

(72) Inventors: Jasmina Markovski, Mesa, AZ (US); Kiril D. Hristovski, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 151 days.

(21) Appl. No.: 16/547,998

(22) Filed: Aug. 22, 2019

(65) Prior Publication Data

US 2020/0061575 A1 Feb. 27, 2020

Related U.S. Application Data

(60) Provisional application No. 62/721,254, filed on Aug. 22, 2018.

(51) Int. Cl.
| | | |
|---|---|---|
| B01J 20/00 | (2006.01) |
| B01J 20/04 | (2006.01) |
| B01J 20/28 | (2006.01) |
| B01J 20/30 | (2006.01) |
| B01J 20/26 | (2006.01) |
| C02F 1/28 | (2006.01) |
| B01D 15/20 | (2006.01) |
| C02F 101/16 | (2006.01) |
| C02F 101/14 | (2006.01) |

(52) U.S. Cl.
CPC ............. *B01J 20/048* (2013.01); *B01J 20/26* (2013.01); *B01J 20/28026* (2013.01); *B01J 20/28097* (2013.01); *B01J 20/3085* (2013.01); *C02F 1/288* (2013.01); *B01J 2220/46* (2013.01); *B01J 2220/4812* (2013.01); *C02F 2101/14* (2013.01); *C02F 2101/163* (2013.01)

(58) Field of Classification Search
CPC combination set(s) only.
See application file for complete search history.

(56) References Cited

U.S. PATENT DOCUMENTS

| | | |
|---|---|---|
| 7,291,578 B2 | 11/2007 | Sengupta et al. |
| 9,751,785 B2 | 9/2017 | Doudrick et al. |
| 9,878,320 B2 | 1/2018 | Hristovski et al. |
| 10,435,311 B2 | 10/2019 | Hristovski et al. |
| 2013/0175220 A1 | 7/2013 | Hristovski et al. |
| 2016/0334311 A1 | 11/2016 | Westerhoff et al. |

(Continued)

OTHER PUBLICATIONS

Santana et al., Nanoscale Research Letters (2016) 11:497 DOI 10.1186/s11671-016-1658-4 (Year: 2016).*

(Continued)

*Primary Examiner* — Allison G Fitzsimmons
(74) *Attorney, Agent, or Firm* — Fish & Richardson P.C.

(57) ABSTRACT

Fabricating a hybrid sorbent media includes contacting a porous material with a first aqueous solution including phosphate ions to yield a first mixture, contacting the first mixture with a second aqueous solution comprising calcium ions to yield a second mixture, and adjusting a pH of the second mixture to form hydroxyapatite inside the porous media to yield the hybrid sorbent media.

17 Claims, 7 Drawing Sheets

(56) References Cited

U.S. PATENT DOCUMENTS

2017/0313601 A1 11/2017 Westerhoff et al.
2018/0080148 A1 3/2018 Westerhoff et al.
2018/0086648 A1 3/2018 Hristovski et al.
2020/0031689 A1 1/2020 Hristovski et al.

OTHER PUBLICATIONS

Jayaweera et al. Chemistry Central Journal (2018) 12:18 https://doi.org/10.1186/s13065-018-0384-7 (Year: 2018).*
U.S. Appl. No. 16/355,016, filed Mar. 15, 2019, Cai et al.
Ferraz et al., "Hydroxyapatite nanoparticles: A review of preparation methodologies," J. of Applied Biomaterials & Biomechanics, 2004, 2:74-80.
Nayak et al., "Comprehensive Understanding of the Kinestics and Mechanism of Fluoride Removal over a Potent Nanocrystalline Hydroxyapatite Surface," ACS Omega, 2017, 2:8118-8128.
Pang et al., "Influence of temperature, ripening time and calcination on the morphology and crystallinity of hydroxyapatite nanoparticles," J. of the European Ceramic Soc., 2003, 23:1697-1704.
Sundaram et al., "Uptake of fluoride by nano-hydroxiyaphite/chitosan, a bioinorganic composite," Bioresource Tech., 2008, 99:8226-8230.

\* cited by examiner

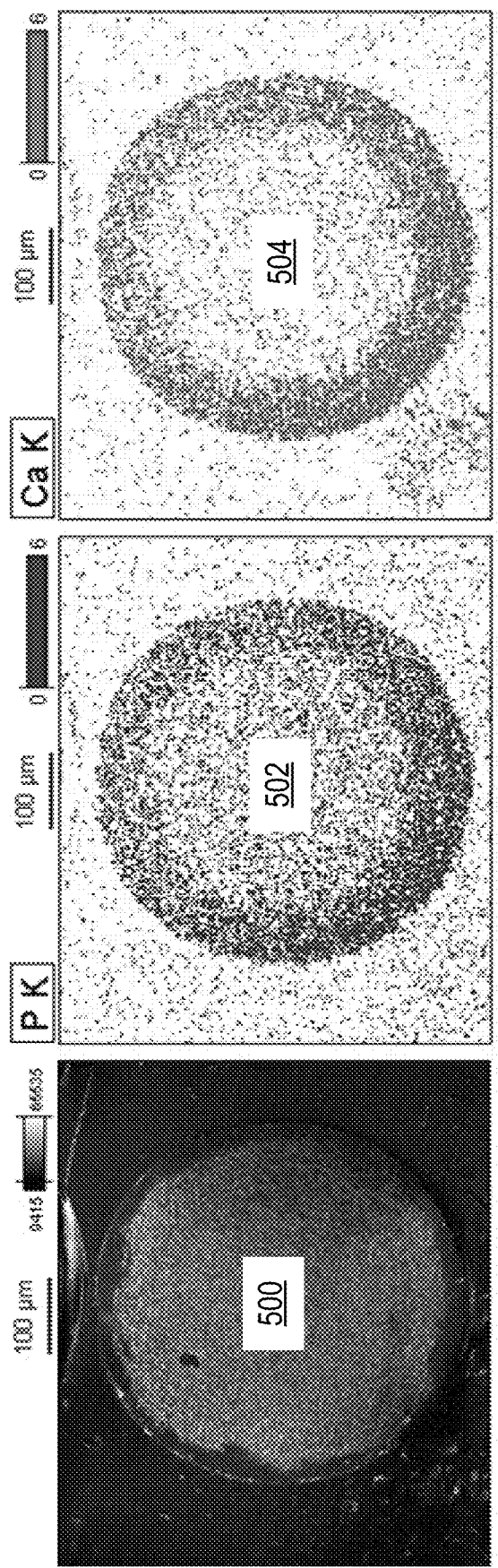

FABRICATION OF HYDROXYAPATITE BASED HYBRID SORBENT MEDIA FOR REMOVAL OF FLUORIDE AND OTHER CONTAMINANTS

CROSS-REFERENCE TO RELATED APPLICATION

This application claims the benefit of U.S. Application No. 62/721,254 entitled "FABRICATION OF HYDROXYAPATITE BASED HYBRID SORBENT MEDIA FOR REMOVAL OF FLUORIDE AND OTHER CONTAMINANTS" and filed on Aug. 22, 2018, which is incorporated by reference herein in its entirety.

TECHNICAL FIELD

This invention relates to fabrication of hydroxyapatite based hybrid sorbent media for removal of fluoride and other contaminants.

BACKGROUND

The fabrication of nano-enabled hybrid sorbent media usually includes precipitation of nanoparticles within the pores of ion-exchange resin (IX), granular activated carbon (GAC), powder activated carbon (PAC), other sorbents, or base support materials. For example, hybrid ion exchange resin (HIX) and hybrid carbon blocks are two commercial products employing nanosized iron (hydr)oxide which allows removal of arsenic along with nitrate or organic pollutants. Similar to iron (hydr)oxide utilization for arsenic removal, hydroxyapatite (HAP) is believed to be suitable for fluoride removal. HAP has been utilized as a sorbent in a form of bulk nanoparticles, sintered scaffolds, and biopolymer binded composites. However, none of these HAP media has been suitable for removal of contaminants in addition to fluoride. Furthermore, fabrication of most of these media typically requires employing temperatures exceeding 1000° C. or biopolymers to sinter, agglomerate, and encapsulate HAP particles.

SUMMARY

This disclosure describes a room temperature process for synthesizing nano hydroxyapatite (HAP) based hybrid sorbents capable of simultaneously removing fluoride and other contaminants. This process is applicable to different porous media including temperature sensitive ones (IX, GAC, PAC, etc).

In a first general aspect, fabricating hybrid sorbent media includes contacting porous media defining pores with a first aqueous solution comprising phosphate ions to yield a first mixture, contacting the first mixture with a second aqueous solution comprising calcium ions to yield a second mixture, and adjusting a pH of the second mixture to initiate formation of hydroxyapatite on pore surfaces of the pores of the porous media to yield the hybrid sorbent media. Contacting the porous media with the first aqueous solution, contacting the first mixture with the second aqueous solution, and adjusting the pH of the second mixture occur at room temperature.

Implementations of the first general aspect can include one or more of the following features. Some implementations include removing some of the first aqueous solution from the first mixture before contacting the first mixture with the second aqueous solution. Certain implementations include aging the hybrid sorbent media to allow growth of hydroxyapatite nanoparticles inside the pores of the porous media. Here, aging includes aging at room temperature for at least 24 hours.

In some implementations, the first aqueous solution includes diammonium hydrogen phosphate, ammonium dihydrogen phosphate, di-sodium hydrogen phosphate, triethyl phosphate, phosphorus pentoxide, phosphoric acid, phosphonoacetic acid, or a combination thereof. A volume ratio of the first aqueous solution to the porous media is about 2:1. The first aqueous solution may be saturated with phosphate at room temperature. Contacting the porous media with the first aqueous solution typically occurs for at least about 24 hours.

In some implementations, the second aqueous solution includes calcium chloride dihydrate, calcium nitrate, calcium hydroxide, calcium acetate, or a combination thereof. Contacting the first mixture with the second aqueous solution typically occurs for at least about 24 hours. Adjusting the pH of the second mixture includes adjusting the pH to an alkaline pH (e.g., in a pH range of about 10 to about 12). Adjusting the pH of the second mixture typically includes combining a basic solution including ammonium hydroxide, sodium hydroxide, urea, or a combination thereof with the second mixture.

In some implementations, the porous media is selected from the group consisting of ion-exchange resin, granular activated carbon, and powder activated carbon.

In a second general aspect, a hybrid sorbent media includes porous media defining pores, and hydroxyapatite nanoparticles contained within the pores of the porous media. The hybrid sorbent media includes at least 30 wt % hydroxyapatite per dry weight of the hybrid sorbent media.

Implementations of the second general aspect may include one or more of the following features.

In some implementations, the hybrid sorbent media is configured to remove fluoride and one or more additional contaminants from an aqueous solution. The porous media is typically selected from the group consisting of ion-exchange resin, granular activated carbon, and powder activated carbon. The porous media can include an ion-exchange resin configured to remove nitrate from an aqueous solution, and the hybrid sorbent media can be configured to remove fluoride and nitrate from an aqueous solution. The hydroxyapatite nanoparticles are typically in the form of needles having a length up to about 100 nm. In one example, a thickness of the hydroxyapatite nanoparticles is about 5 nm. The hydroxyapatite nanoparticles can be in the form of aggregates having a dimension of about 100 nm to about 2 μm. The porous media can have dimensions in a range of about 200 μm to about 2 mm.

Advantages of the HAP based hybrid sorbent media described herein include energy savings in comparison to fabrication of other media that require elevated temperatures (e.g., >400° C.) for activation. HAP based hybrid sorbent media can remove fluoride along with other contaminants (e.g., nitrate in the case of hydroxyapatite based strong base ion-exchange media). HAP is a biocompatible supplement compound and is not harmful to human health, a consideration when leaching occurs.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIGS. 5A-5C show energy-dispersive X-ray spectroscopy (EDS) cross-sectional mapping images showing spatial distribution of elements (P, Ca) representing hydroxyapatite (HAP) inside a hydroxyapatite based hybrid ion-exchange media (HIX-HAP) bead.

DETAILED DESCRIPTION

A process to fabricate hydroxyapatite (HAP) based hybrid sorbent media capable of removing fluoride and other contaminants from water in continuous-flow systems without membrane separation requirements is described. As used herein, "HAP" refers to calcium hydroxyapatite ($Ca_5(PO_4)_3$ OH). The synthesis process uses a room temperature, in-situ, nano-enabling approach suitable for production of large quantities of the hybrid media containing up to or at least 30 wt % of HAP per dry weight. As used herein, "room temperature" generally refers to ambient temperature in a laboratory setting (e.g., 21±2° C.). The resulting nano-enabled HAP strong base ion-exchange media (hybrid media) have sufficient sorption capability to remove fluoride along with other contaminants, such as nitrate, sulfate, organic pollutants, and the like. Hybridization of sorbent media by nano HAP nanoparticles ("nano HAP") may change steric effects and improve contaminant removal at specific media doses when compared to pristine sorbent. Fabrication methods described herein are generally applicable to different sorbents, ion-exchange media, and other porous supporting materials as appropriate. Examples of suitable porous media include ion exchange resin (IX), granular activated carbon (GAC), and powder activated carbon (PAC).

The inclusion of HAP nanoparticles in porous support materials ("HAP nano enabling") may overcome drawbacks related to the size of nanomaterials and allow application of HAP based hybrid sorbent media in continuous flow systems without separation requirements. That is, the combination of HAP nanoparticles with pre-made macroscale hierarchical structures of porous having favorable sorption and hydraulic properties is a synergistic combination that yields improved removal of multiple contaminants. In some implementations, the hybrid media may also provide one-step purification of water polluted by multiple contaminants, especially applicable for treatment of household solutions such as point-of-use systems that require removal of multiple contaminants under high hydraulic loading rates of water. Hybrid media described herein obviate the necessity for pre- and post-pH adjustment of water to be treated.

Figure 1:
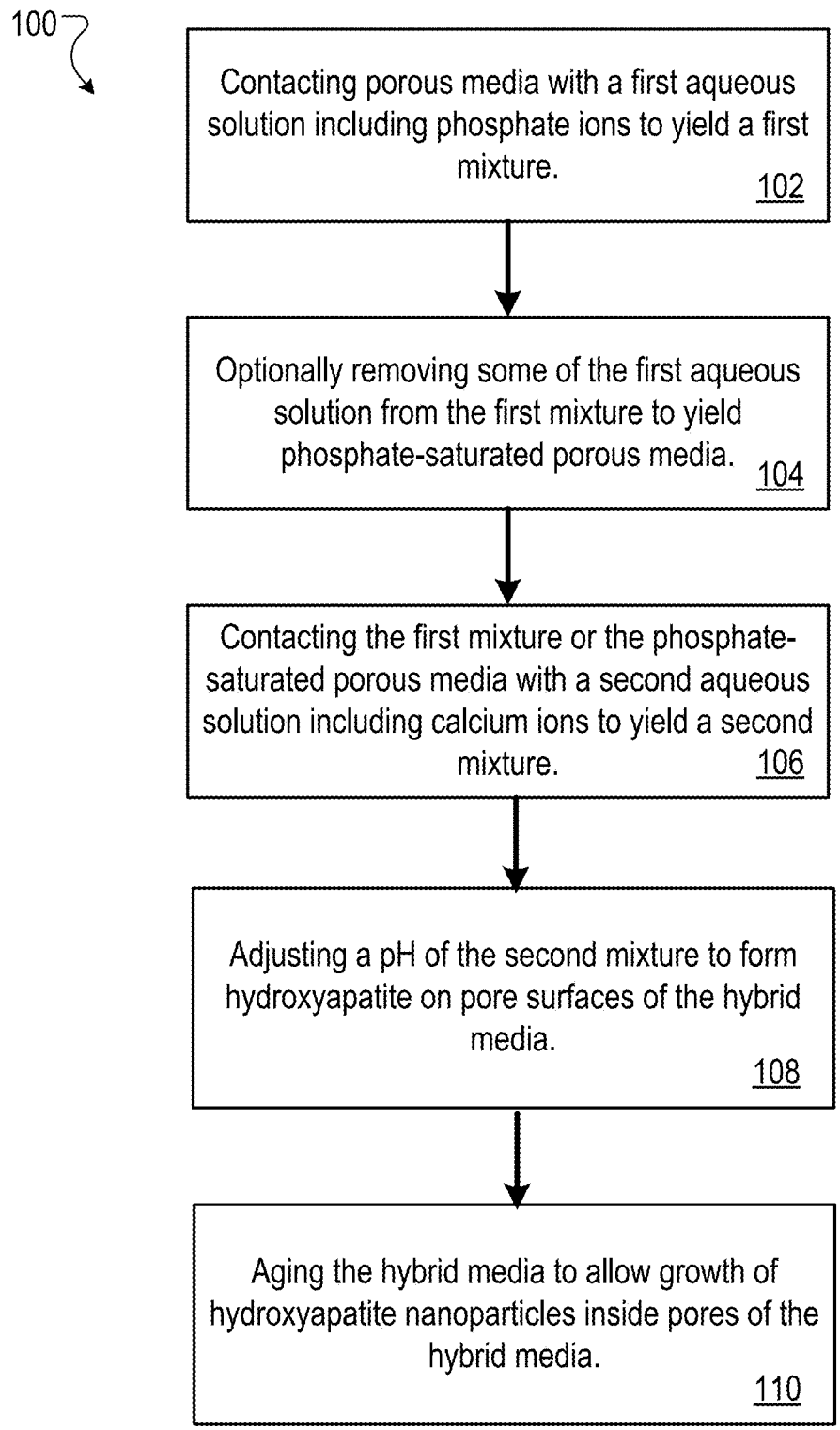
FIG. 1 is a flowchart showing operations in a process for fabrication of hydroxyapatite (HAP) based hybrid sorbent.

FIG. 1 is a flowchart illustrating operations in room-temperature process 100 for HAP based hybrid sorbent fabrication at room temperature. In 102, porous media is contacted with a first aqueous solution including phosphate ions to yield a first mixture. Examples of suitable sources of phosphate ions include diammonium hydrogen phosphate, ammonium dihydrogen phosphate, di-sodium hydrogen phosphate, triethyl phosphate, phosphorus pentoxide, phosphoric acid, and phosphonoacetic acid. The first aqueous solution may be saturated with phosphate ions prior to contacting with the porous media. The porous media is typically immersed in or covered with the first aqueous solution. In one example, a volume ratio of the first aqueous solution to the porous media is about 2:1. The length of contacting may be sufficient to allow diffusion of ions inside pores of the porous media. In one example, the length of contacting is at least about 24 hours. In some cases, the porous media is wet prior to contacting with the first aqueous solution, thereby promoting diffusion of ions inside the pores of the media. Wet porous media may be prepared by soaking in water (e.g., for 24 hours) to achieve maximal moisture content.

In 104, some of the first aqueous solution is optionally removed from the first mixture to yield phosphate-saturated porous media. In some examples, removing some of the first aqueous solution includes one or more of decanting, centrifugation, and filtration of first mixture.

In 106, the first mixture of 102 or the phosphate-saturated porous media of 104 is contacted with a second aqueous solution including calcium ions to yield a second mixture. Examples of suitable sources of calcium ions include calcium chloride dihydrate, calcium nitrate, calcium hydroxide, and calcium acetate. The second aqueous solution may be saturated with calcium ions prior to contacting with the phosphate-saturated porous media. The phosphate-saturated porous media is typically immersed in or covered with the second aqueous solution. The length of contacting may be sufficient to allow diffusion of ions inside pores of the porous media. In one example, the length of contacting is at least about 24 hours.

In 108, a pH of the second mixture is adjusted to form (or initiate formation of) hydroxyapatite on pore surfaces of the porous media (e.g., to precipitate hydroxyapatite inside the porous media). The hydroxyapatite may be in the form of hydroxyapatite nanoparticles. Forming hydroxyapatite on pore surfaces of the porous media yields a hybrid sorbent media with pores that contain HAP. Adjusting the pH typically refers to adjusting the pH to an alkaline pH (e.g., in a range of about 10 to about 12) by combining a basic solution with the second mixture to initiate HAP precipitation. Examples of suitable basic solutions include solutions containing ammonium hydroxide, sodium hydroxide, urea, or any combination thereof. Adjusting the pH of the second mixture may result in the formation of a suspension.

In 110, the hybrid media can be aged at room temperature (e.g., for 24 hours) to allow growth of hydroxyapatite nanoparticles inside pores of the hybrid media. Generally, a higher content of HAP in the hybrid media may be attributed to a higher concentration of phosphate and calcium in the first and second aqueous solutions. The hydroxyapatite nanoparticles are typically in the form of needles having a length up to about 100 nm. In one example, a thickness of the hydroxyapatite nanoparticles is about 5 nm. The hydroxyapatite nanoparticles can be in the form of aggregates having a dimension of about 100 nm to about 2 The porous media can have dimensions in a range of about 200 µm to about 2 mm.

EXAMPLE

The process described with respect to FIG. 1 was employed to fabricate nano-enabled HAP ion-exchange hybrid media. In one example procedure, 60 g (0.45 mol) of diammonium hydrogen phosphate $((NH_4)_2HPO_4)$ was dissolved in 100 mL of deionized water, and the mixture was stirred until clear solution A was formed. Commercially available wet strong-base ion-exchange resin (Purolite A520E, IX), presoaked in ultrapure water, was combined with solution A and mixed for 24 h in a closed vessel. A ratio of solution A to ion-exchange media was 2:1 by volume. Separately, 100 g (0.68 mol) of calcium chloride dihydrate $(CaCl_2 \times 2H_2O)$ was dissolved in 100 mL of deionized water to form clear solution B. When excess solution A was decanted from the resin, solution B was added and mixed for 24 h in a closed vessel. In order to initiate precipitation of HAP, ammonium hydroxide solution was combined with the mixture of resin and solution B. The pH was stabilized in the range 10-12 when white particles of HAP started to be formed inside the pores of the ion-exchange media and in the surrounding solution. The growth of HAP was allowed for 24 h. The media (HIX-HAP) was rinsed with ultrapure water until no excess HAP particles were visible and pH of water decreased to 7. The media was stored wet before use.

Figure 2:
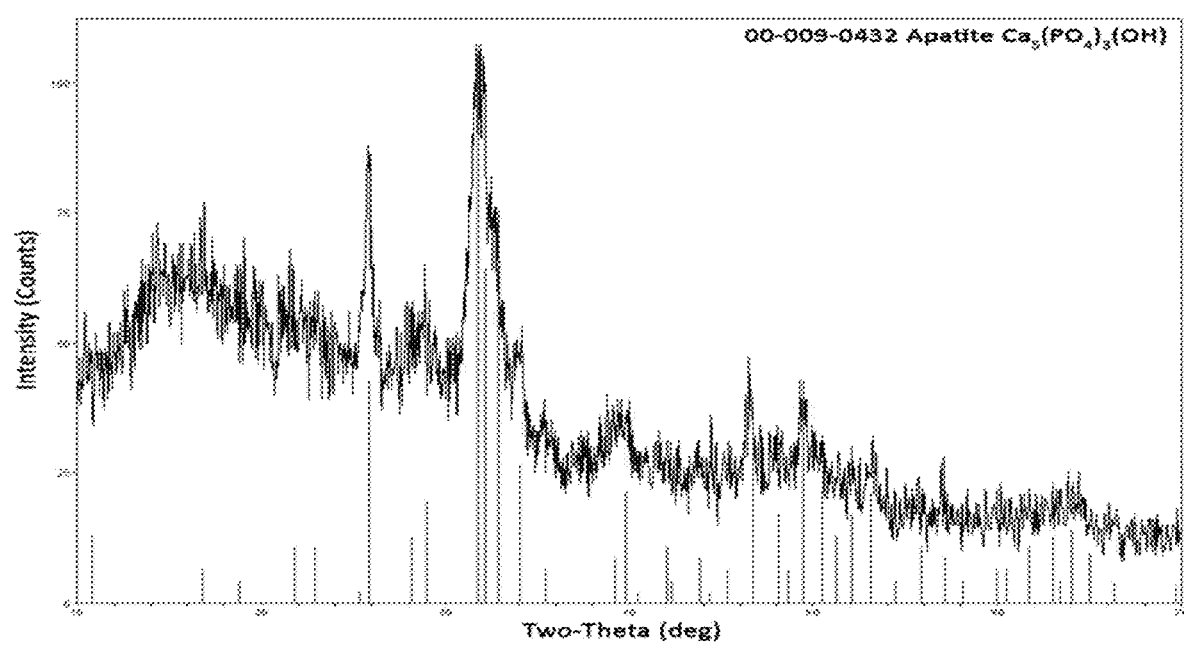
FIG. 2 shows an X-ray diffraction spectrum of the hydroxyapatite (HAP) inside the hydroxyapatite based hybrid ion-exchange media (HIX-HAP).

FIG. 2 shows an X-ray diffraction spectrum of the hydroxyapatite (HAP) inside the hydroxyapatite based hybrid ion-exchange media (HIX-HAP). This spectrum confirms that the poorly crystallized HAP is formed inside the pores of fabricated hybrid media. This form of HAP exhibits Ca/P=1.67 and represents a stable form of calcium phosphate. Results of gravimetric analysis showed that ~30 wt % HAP was formed per dry weight of hybrid media (Table 1). The attached HAP changed media surface reflected as an increase in point of zero charge ($pH_{PZC}$) from 4.7 (IX) to 7.4 (HIX-HAP), typical for bulk HAP (Table 1). The high quantity of HAP inside the macroporous structure of IX clogged some of the pores in the porous media.

TABLE 1

Hydroxyapatite content, point of zero charge, specific surface area, and pore properties of hydroxyapatite based hybrid (HIX-HAP) versus pristine (IX) media.

| Media | HAP (wt %) | pHpzc | Bulk porosity, ε (%) | BET Surface Area* ($m^2/g$) | Cumulative pore volume* ($cm^3/g$) |
|---|---|---|---|---|---|
| IX | — | 4.7 | 77 | 7.15 | 0.017 |
| HIX-HAP | 30 | 7.4 | 72 | 31.99 | 0.11 |

*Results refer to pores between 1.7 nm and 300 nm width as a detection limit of instrument.

Figure 3A:
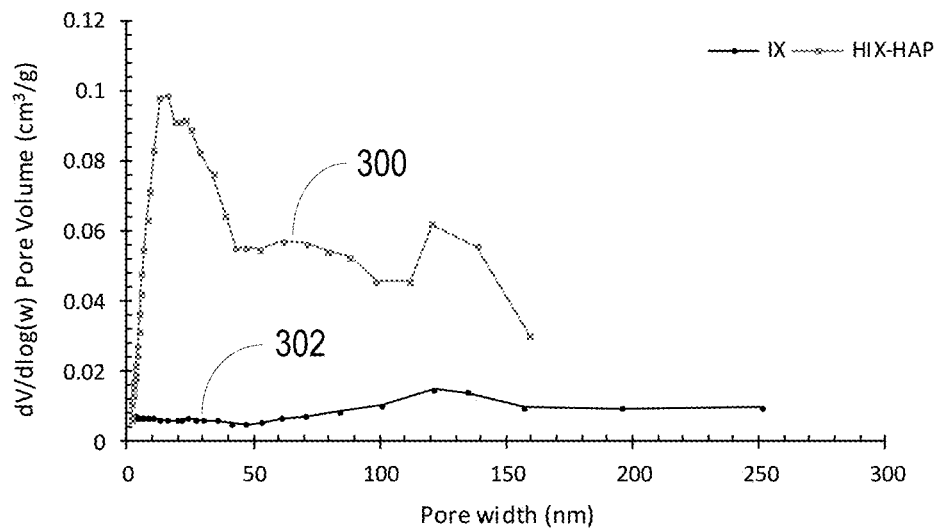
FIGS. 3A and 3B show Barrett, Joyner, and Halenda (BJH) differential adsorption pore volume and pore area distribution, respectively, showing formation of smaller pores and additional surface area for hydroxyapatite based hybrid ion-exchange media (HIX-HAP) and pristine ion-exchange resin (IX).
Figure 3B:
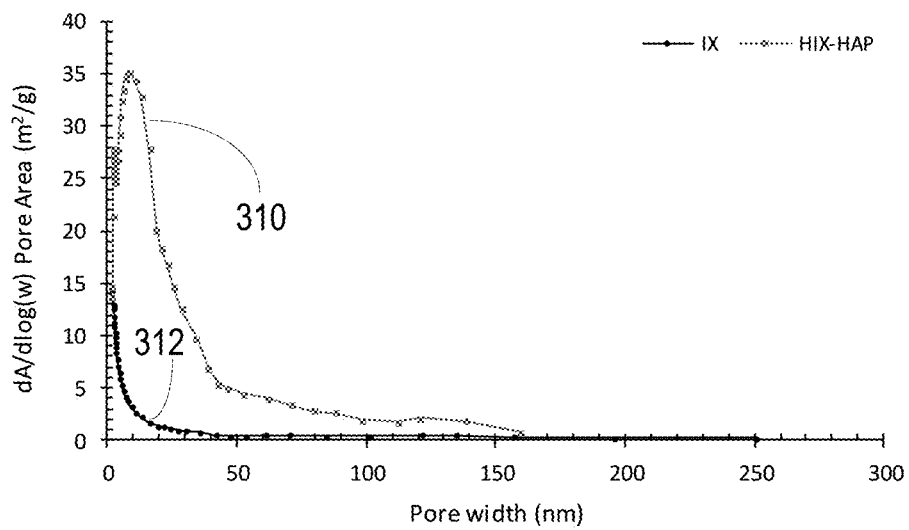

FIGS. 3A and 3B show Barrett-Joyner-Halenda (BJH) differential adsorption pore volume and pore area distribution, respectively, showing formation of smaller pores and additional surface area for hydroxyapatite based hybrid ion-exchange media (HIX-HAP) (plots 300, 310) and pristine ion-exchange resin (IX) (plots 302, 312). Although the bulk porosity of media decreased from 77% (IX) to 72% (HIX-HAP) (Table 1), FIGS. 3A and 3B illustrate that clogging of macropores resulted in creation of smaller mesopores (pore width ~20 nm) and macropores (pore width ~130 nm). Consequently, Brunauer-Emmett-Teller (BET) surface area and cumulative pore volume increased 4 and 6 times, respectively in favor of HIX-HAP.

Figures 4A, 4B:
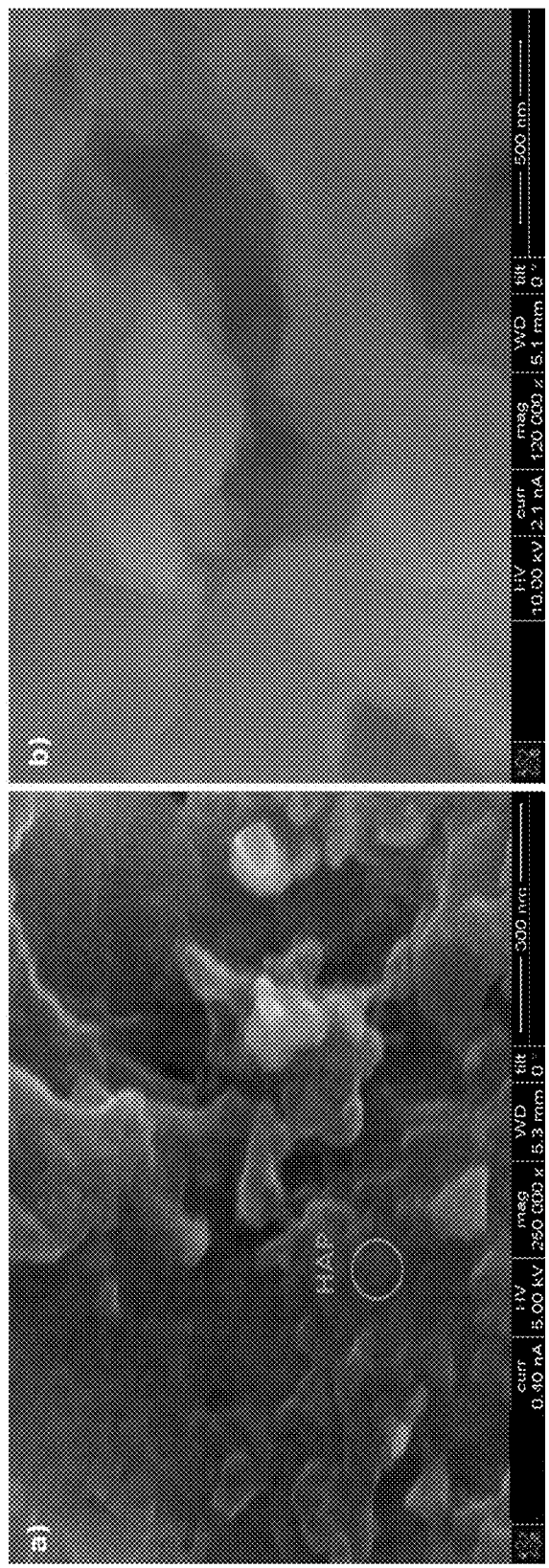
FIGS. 4A and 4B show cross-sectional scanning electron microscope (SEM) images showing morphological differences between hydroxyapatite based hybrid ion-exchange media (HIX-HAP) and pristine ion-exchange resin (IX), respectively.

FIGS. 4A and 4B show cross-sectional scanning electron microscope (SEM) images of hydroxyapatite based hybrid ion-exchange media (HIX-HAP) and pristine ion-exchange resin (IX), respectively. These images show morphological differences between HIX-HAP and IX, and confirm that HAP nanoparticles smaller than 100 nm were formed inside the resin, thus explaining the observed increase of pore area in HIX-HAP media.

FIG. 5A shows an energy-dispersive X-ray spectroscopy (EDS) image of a hydroxyapatite based hybrid ion-exchange media (HIX-HAP) bead 500. FIGS. 5B and 5C show cross-sectional mapping images 502 and 504 showing spatial distribution of phosphorus and calcium, respectively, representing HAP inside the HIX-HAP bead. The elemental mapping of phosphorus and calcium show a higher concentration of HAP closer to the edge of the bead. This suggests that a content of HAP can be increased to over 30 wt %, to further emphasize HAP properties in the hybrid media.

Figure 6:
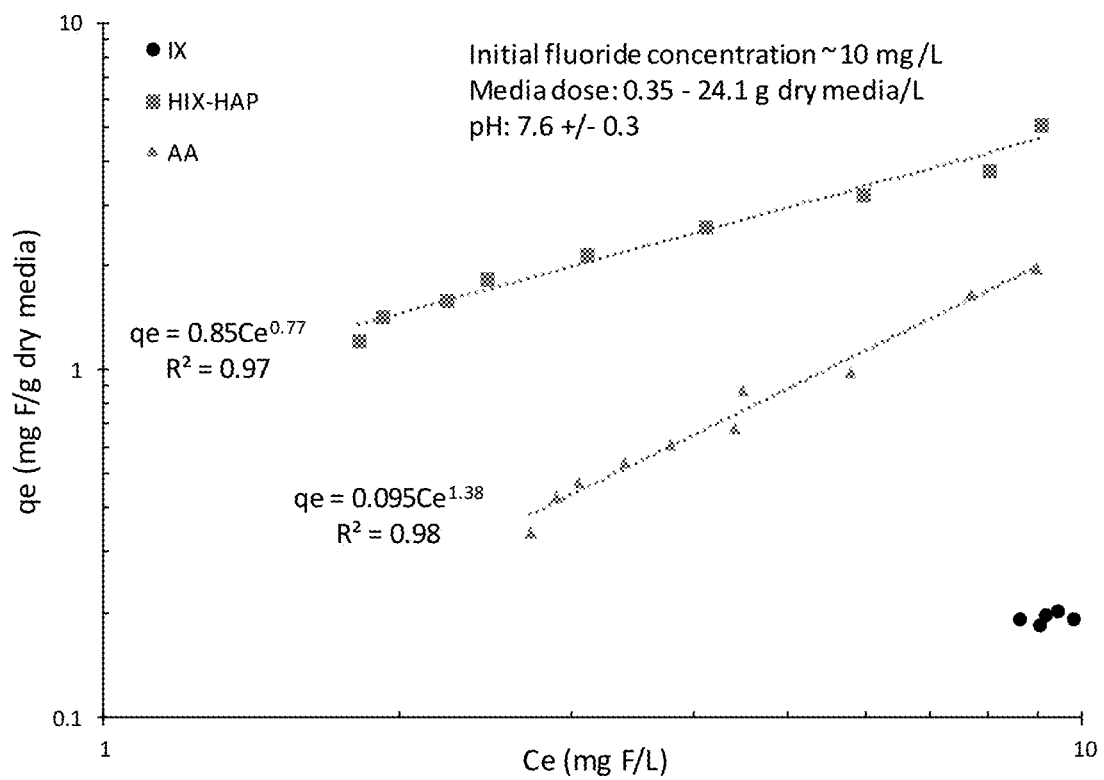
FIG. 6 shows a Freundlich isotherm for fluoride showing improved fluoride adsorption capacity for hydroxyapatite based hybrid ion-exchange media (HIX-HAP) in comparison to activated alumina (AA) and pristine ion-exchange resin (IX) in a complex water matrix.

FIG. 6 shows a Freundlich isotherm for fluoride showing improved fluoride adsorption capacity for hydroxyapatite based hybrid ion-exchange media (HIX-HAP) in comparison to activated alumina (AA) and pristine ion-exchange resin (IX) in a complex water matrix. These results demonstrate the ability of the HIX-HAP media to remove fluoride from a complex water matrix that represents synthetic NSF 53 challenge water spiked with ~10 mg F/L and ~80 mg $NO_3$/L that simulates natural groundwater at realistic pH. In such a competing environment, HIX-HAP media appears to be more effective than conventional activated alumina (AA) (AA-400G, 28×48 mesh, Alcan). As indicated by the isotherms, for the initial fluoride concentration $C_o$~10 mg/L, maximal sorption capacity of HIX-HAP is $q_o$~5 mg F/g dry media which is >2 fold increase when compared to AA with $q_o$~2 mg F/g dry media. Additionally, fluoride sorption by HIX-HAP is an energetically favorable reaction with Freundlich sorption intensity parameter 1/n=0.77, in contrast to AA which is energetically unfavorable (1/n=1.38). Thermodynamic favorability further suggests that the superiority of HIX-HAP over AA can be even higher as the initial concentration of fluoride decreases. Considering that IX demonstrated negligable fluoride sorption, acquired fluoride selectivity of HIX-HAP is may be interpreted as a result of added HAP.

Figure 7:
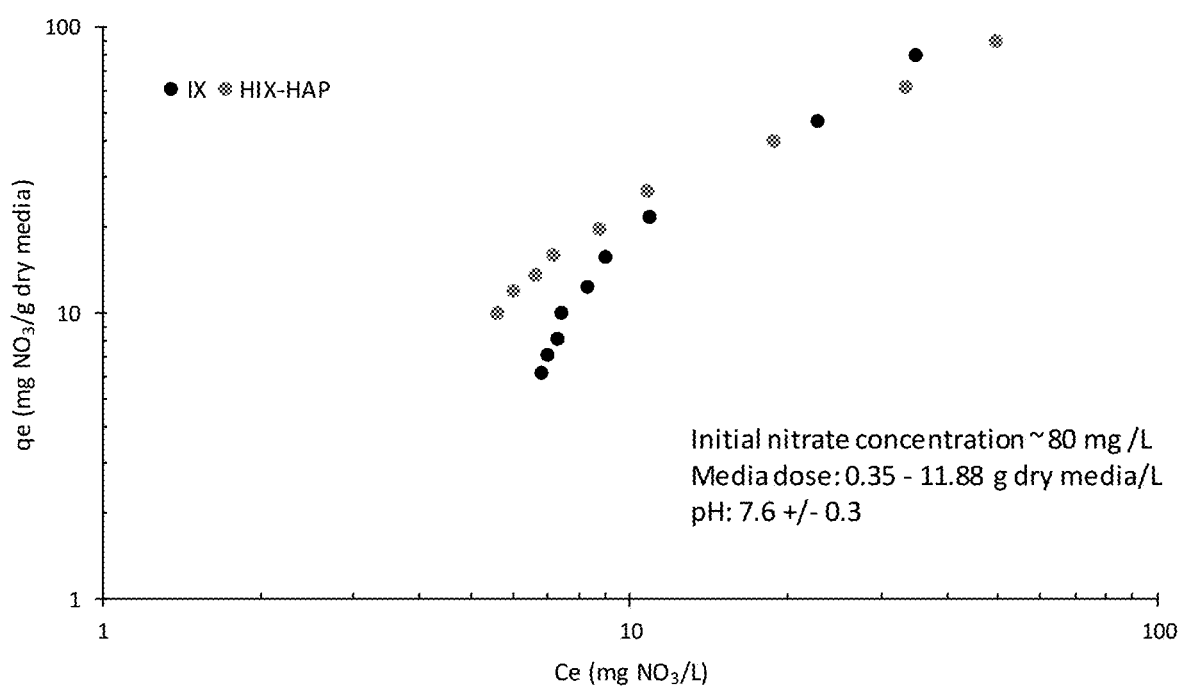
FIG. 7 shows the retained or improved ability of the hydroxyapatite based hybrid ion-exchange media (HIX-HAP) to remove nitrate ions from a complex water matrix in comparison to pristine ion-exchange resin (IX).

FIG. 7 shows the retained or improved ability of the hydroxyapatite based hybrid ion-exchange media (HIX-HAP) to remove nitrate ions from a complex water matrix in comparison to pristine ion-exchange resin (IX). As illustrated in FIG. 7, HIX-HAP did not lose nitrate removal capability in comparison to IX. In contrast, HIX-HAP appears to be more effective for removal nitrate at higher media doses.

Figure 8:
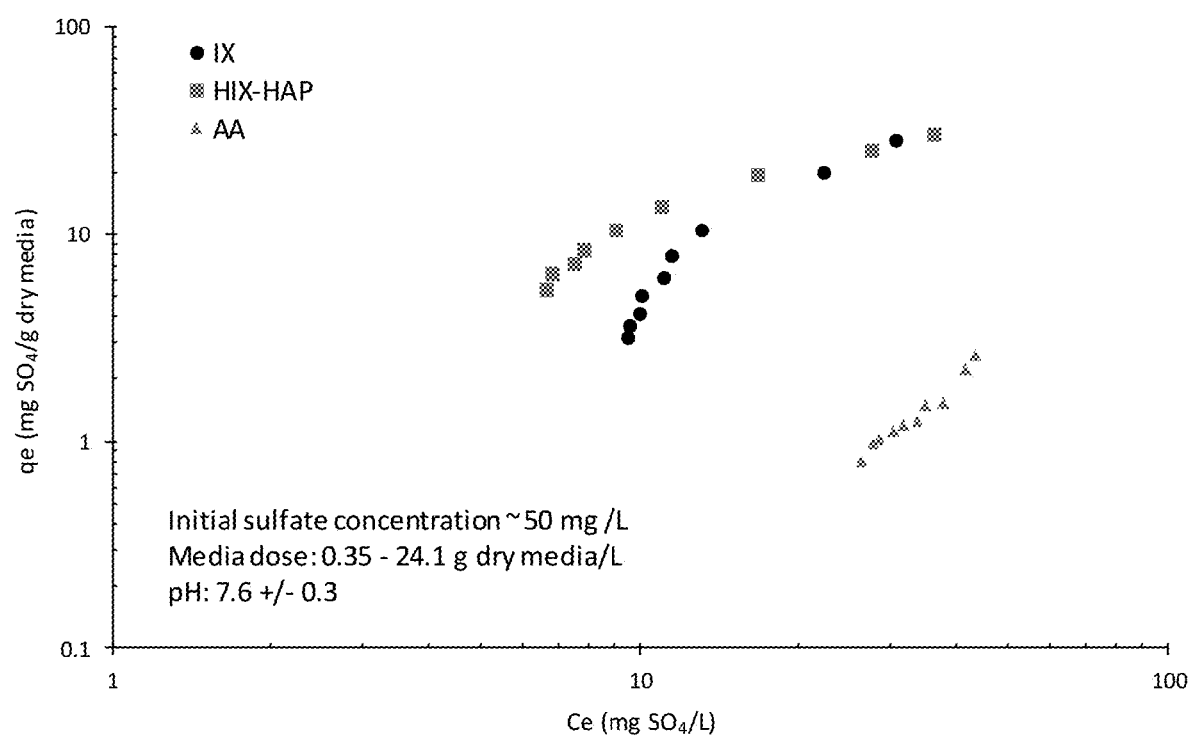
FIG. 8 shows the retained or improved ability of the hydroxyapatite based hybrid ion-exchange media (HIX-HAP) to remove sulfate ions from complex water matrix in comparison to pristine ion-exchange resin (IX) and activated alumina (AA) in a complex water matrix.

FIG. 8 shows the retained or improved ability of the hydroxyapatite based hybrid ion-exchange media (HIX-HAP) to remove sulfate ions from complex water matrix in comparison to pristine ion-exchange resin (IX) and activated alumina (AA) in a complex water matrix. As compared to the results in FIG. 7, HIX-HAP appeared to be slightly more affective than IX at higher media doses and significantly more effective than AA over all tested media dose range.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of fabricating hybrid sorbent media, the method comprising:
    contacting porous media defining pores with a first aqueous solution comprising phosphate ions to yield a first mixture;
    contacting the first mixture with a second aqueous solution comprising calcium ions to yield a second mixture; and
    adjusting a pH of the second mixture to initiate formation of hydroxyapatite on pore surfaces of the pores of the porous media to yield the hybrid sorbent media,
    wherein the porous media is an ion-exchange resin, and contacting the porous media with the first aqueous solution, contacting the first mixture with the second aqueous solution, and adjusting the pH of the second mixture occur at room temperature.

2. The method of claim 1, further comprising removing some of the first aqueous solution from the first mixture before contacting the first mixture with the second aqueous solution.

3. The method of claim 1, further comprising aging the hybrid sorbent media to allow growth of hydroxyapatite nanoparticles inside the pores of the porous media.

4. The method of claim 3, wherein aging comprises aging at room temperature for at least 24 hours.

5. The method of claim 1, wherein the first aqueous solution comprises diammonium hydrogen phosphate, ammonium dihydrogen phosphate, di-sodium hydrogen phosphate, triethyl phosphate, phosphorus pentoxide, phosphoric acid, phosphonoacetic acid, or a combination thereof.

6. The method of claim 1, wherein a volume ratio of the first aqueous solution to the porous media is about 2:1.

7. The method of claim 1, wherein the first aqueous solution is saturated with phosphate at room temperature.

8. The method of claim 1, wherein contacting the porous media with the first aqueous solution occurs for at least about 24 hours.

9. The method of claim 1, wherein the second aqueous solution comprises calcium chloride dihydrate, calcium nitrate, calcium hydroxide, calcium acetate, or a combination thereof.

10. The method of claim 1, wherein contacting the first mixture with the second aqueous solution occurs for at least about 24 hours.

11. The method of claim 1, wherein adjusting the pH of the second mixture comprises adjusting the pH to an alkaline pH.

12. The method of claim 11, wherein the alkaline pH is in a range of about 10 to about 12.

13. The method of claim 11, wherein adjusting the pH of the second mixture comprises combining a basic solution with the second mixture, wherein the basic solution comprises ammonium hydroxide, sodium hydroxide, urea, or a combination thereof.

14. The method of claim 1, wherein the hybrid sorbent media comprises at least 30 wt % hydroxyapatite per dry weight of the hybrid sorbent media.

15. The method of claim 14, wherein the hybrid sorbent media is configured to remove fluoride from an aqueous solution.

16. The method of claim 15, wherein the hybrid sorbent media is further configured to remove nitrate from the aqueous solution.

17. The method of claim 1, wherein the hydroxyapatite nanoparticles are in the form of needles having a length up to about 100 nm.

* * * * *